2 Sheets—Sheet 1.
S. RAWSON, S. THACHER & I. RAWSON.
HARVESTER.
No. 181,477.     Patented Aug. 22, 1876.
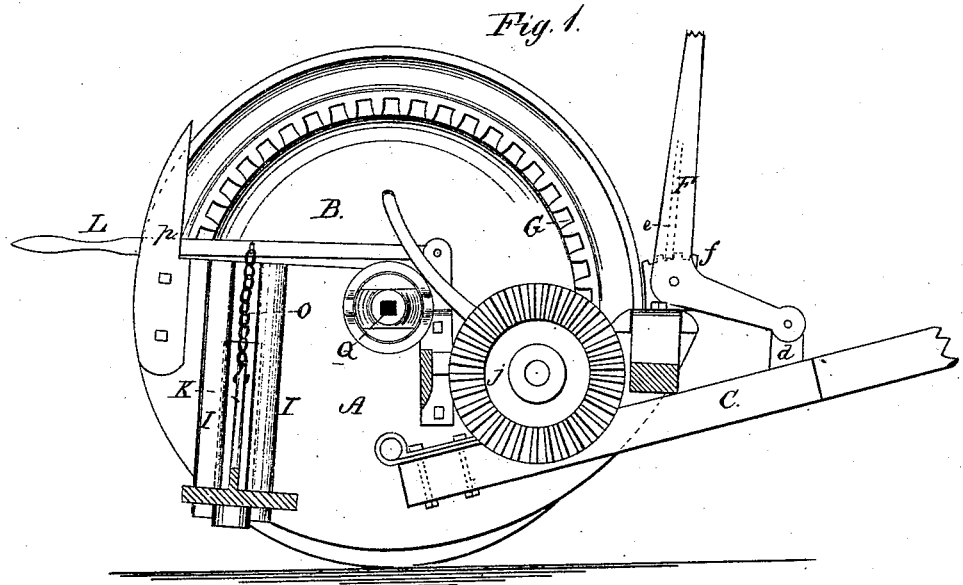
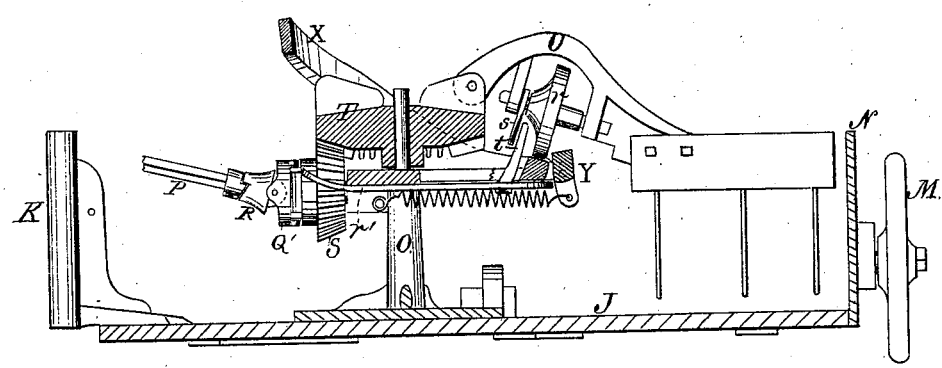
WITNESSES:
W. W. Hollingsworth
[signature]
INVENTOR:
S. Rawson
S. Thacher
BY I. Rawson
[signature]
ATTORNEYS.

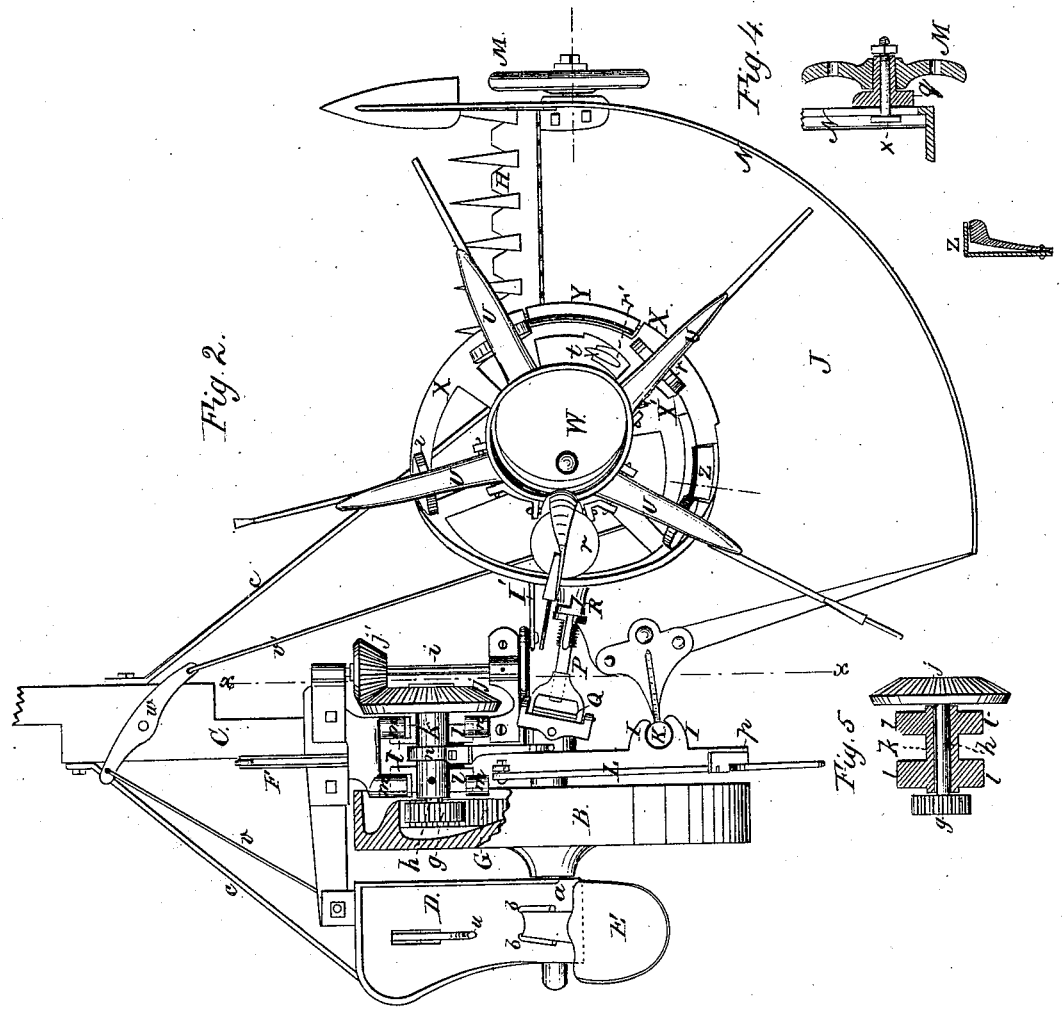

UNITED STATES PATENT OFFICE.

SOLOMON RAWSON, SCOTT THACHER, AND ISAAC RAWSON, OF HORNELLS-VILLE, NEW YORK.

IMPROVEMENT IN HARVESTERS.

Specification forming part of Letters Patent No. 181,477, dated August 22, 1876; application filed April 15, 1876.

*To all whom it may concern:*

Be it known that we, SOLOMON RAWSON, SCOTT THACHER, and ISAAC RAWSON, of Hornellsville, in the county of Steuben and State of New York, have invented a new and Improved Reaper; and we do hereby declare that the following is a full, clear, and exact description of the same, reference being had to the accompanying drawing, forming part of this specification, in which—

Figure 1 is a section through line $x\ x$ of Fig. 2; Fig. 2, a plan view; Fig. 3, a vertical section of the rake-arm devices. Fig. 4 is a sectional detail of one of the supporting-wheels of the table; Fig. 5, a detail of the shifting mechanism for the sickle.

Our invention relates to certain improvements in reapers for harvesting grain; and it consists in the adjustment of the devices for connecting and disconnecting the sickle; in the means for regulating the movements of the rake-arms, which are so arranged as to move upon a double track and operate either as rakes or beaters; and in the arrangement of the main frame with respect to the platform, sickle-driving mechanism, and tongue, whereby the main frame, with the platform and sickle-driving mechanism, are made together adjustable upon the main axle, all as hereinafter more fully described.

In the drawing, A represents the main frame, of a semicircular shape, with the curved part downward. In the top central portion of the frame is journaled the axle of the main driving-wheel B. To the front part of the frame are attached the devices operating the sickle-bar. To the rear portion is attached the platform, and to the lower central portion of the frame, just below the axle of the main drive-wheel, is pivoted the tongue C. This arrangement brings the tongue in a line with the cutter-bar, so that the draft is better, and the relative arrangement is such as to make the implement in better balance upon the central axle, by means of which the main frame, sickle-driving mechanism, sickle, and platform are made together adjustable in vertical planes, thus obviating the necessity of a jointed connection between the sickle and its driving mechanism. The outer journal of the drive-wheel B is arranged in a bearing, $a$, in the base-piece D, which is connected at the front with the frame A. Upon this base-piece is constructed the driver's seat E, upon the outside of the wheel, which position causes it to operate as a counter-balance to the operating devices upon the other side. This base-piece is cast with a depression, so as to form a support for the driver's feet, and the spring carrying the seat is connected therewith by being slid into guides $b$, cast upon the said base-piece. The tongue C is provided with stay-rods $c\ c$ upon each side, connecting, respectively, with the platform and base of the driver's seat.

F is an elbow-lever, pivoted to the frame A at its angle, and connected, through a link, $d$, with the tongue. Said lever is provided with a locking-bolt, $e$, which engages with a notched segment, $f$, and serves to regulate the relative positions of the tongue and the platform, with its operating mechanism.

By operating this lever to elevate or lower the cutter-bar, it will be seen that both the platform and its co-operating parts move together, doing away with joints in the connecting-rod, and preventing all binding and friction.

The main wheel has an internal gear, G, which meshes with and imparts motion to the pinion $g$ on the main sickle-bar shaft $h$, which shaft imparts its motion to shaft $i$, at right angles thereto, through the bevel-wheels $j\ j'$, which motion is converted into the longitudinally-reciprocating movement of the sickle H by means of a pitman or connecting-rod, I'. The shaft $h$, with the pinion $g$ and bevel-wheel $j$, are made together adjustable laterally from the gear G of the main wheel, and from the bevel-wheel $j'$, for the purpose of breaking connection between the main wheel and the sickle-bar, in order to stop the operation of the latter. To effect this adjustment the shaft $h$ is journaled its entire length in a bearing, $k$, which is provided with lugs $l$, that slide under guide-hooks $m$ upon the frame A. The said bearing $k$ is surrounded by a cam-collar, $n$, made in two pieces and bolted together, one of which pieces is extended in the form of a lever, by deflecting which the cam-collar bears against the frame A, and moves the contained shaft from one side to the other, to connect or disconnect the sickle-bar mechanism.

The advantage of this arrangement is, that when the parts are disconnected no part of the machine is in motion except the main wheel.

Upon the rear portion of the frame A are formed vertical guides I I, in between which slides a short vertical standard, K, which is firmly attached to and supports one side of the platform J. L is an adjusting-lever, pivoted to an extension of frame A at one end, and provided near the middle with a chain, e, attached to the platform-standard, by means of which lever the platform may be raised or lowered in its guide, the said lever being held in fixed position by notches formed in a standard, p, affixed to the rear of frame A. Upon the opposite side of the platform is arranged the supporting-wheel M. This wheel is pivoted upon the tubular journal q, which journal is made vertically adjustable in a slot in the guard-rail N, to correspond to the adjustment of the platform upon the other side. The tubular journal q is provided with an internal headed screw, x, which, when the nut is screwed up, causes the guard-rail to be tightly clamped between the said tubular journal and the head of the screw-bolt, and the wheel to be held fixedly in its adjustments.

The rake-arms are supported upon a pedestal, O, which is firmly fixed upon the platform. Motion is imparted to the said arms from the main axle of the drive-wheel through the shaft P, having two universal joints, Q Q', and a clutch-coupling and spring, R, to prevent the operation of the rake-arms while backing. The joint Q' rotates a pinion, S, which gears with and turns the horizontal crown-wheel T, which is pivoted upon the pedestal O. To the upper side of this crown-wheel are pivoted the rake-arms U, which are each provided with friction-wheels r. As the rake-arms revolve, the wheels r pass successively upon the lower portion of the track, (which is made double, for the purpose hereinafter described,) and then pass upon the higher portion next to the driver, which changes their plane of rotation, and lifts the arms out of the way of the driver and the operating parts of the machine, a central stationary plate, W, serving to limit the motion of the arms upon their pivots, and assist in guiding them in their revolution. The track X is made continuous and unbroken, and upon the same the friction-wheels of the rake-arms run. This track will not, however, permit the rakes to descend near enough to the platform to rake off the gavel as it accumulates for a full bundle, and to meet this requirement the lower part of the track is made double, with the portion X' lower down and nearer the center. Upon some of the rake-arms are constructed pendent extensions s, and upon the bottom of the track is pivoted a lever, r', whose end projects up through the track in the form of a cam, t, with which this extension engages whenever the lever is deflected.

Y is a portion of the main track pivoted longitudinally, so as to rock, and arranged near the cam t. Z is a portion of the main track supported upon a spring, but capable of being pushed to one side.

The operation of the parts just described is as follows: Ordinarily the friction-wheels of the rake-arms run upon the outer continuous track, passing in their revolution low enough to bend the grain to the cutter-bar, but not low enough to rake off the gavel from the rake. Now, when the cut grain accumulates upon the table, and a gavel sufficient for a full bundle is to be raked off, the driver pushes with his foot a lever, u, which, through rods v v' and lever w, draws to one side lever r' against the pressure of a spring, which brings cam t outside of the extension s of the rake-arm, and at the same time rocks the section Y of the main track away from the center. Now, as the extension comes in contact with the cam it is drawn inwardly, and the section Y being rocked out of the way, the wheel passes upon the lower track X', in which position the rake sweeps off the gavel from the platform to form a bundle. As the friction-wheel passes the junction of the two tracks and commences to rise, it pushes laterally the section Z of the track out of the way, and again mounts the main track. The spring-seated section Z serves to complete the main track, and yet allows the wheels to emerge from the lower track to the main one.

Having thus described our invention, what we claim as new is—

1. The shaft h, carrying wheels g and j, in combination with the continuous bearing k, moving in guides, and the cam-collar n, provided with a lever-extension, as and for the purpose described.

2. The track X, made double at X', and having a rocking portion, Y, and a spring-seated section, Z, as and for the purpose described.

3. The track having a double portion, X', a rocking section, Y, and a spring-seated section, Z, in combination with the rake-arm, having extensions s, the subjacent lever r, having cam t, the rods v v', and the levers u w, substantially as and for the purpose described.

4. The frame A, carrying the platform in the rear and sickle-driving mechanism in front, and made together adjustable therewith on the main axle, as a pivot to regulate the height of the cutter-bar, in combination with the tongue loosely pivoted to the main frame immediately below the main axle, and an elbow-lever, F, for adjusting the said main frame with respect to the tongue, substantially as described.

SOLOMON RAWSON.
    SCOTT THACHER.
    ISAAC RAWSON.

Witnesses:
  RODNEY DENNIS,
  FAY P. RATHBUN.